United States Patent [19]

Ginn et al.

[11] Patent Number: 4,796,651

[45] Date of Patent: Jan. 10, 1989

[54] VARIABLE GAS VOLUME FLOW MEASURING AND CONTROL METHODS AND APPARATUS

[75] Inventors: LeRoy D. Ginn, 15247 Laverne Ct.; LeRoyce S. Ginn, 1749 Kappa Ave., both of San Leandro, Calif. 94579; Karen B. Schneider, Berkeley, Calif.

[73] Assignees: LeRoy D. Ginn; LeRoyce S. Ginn, both of San Leandro, Calif.

[21] Appl. No.: 175,234

[22] Filed: Mar. 30, 1988

[51] Int. Cl.⁴ ............................................. G05D 7/00
[52] U.S. Cl. ...................................... 137/8; 137/487; 137/487.5; 137/624.11; 73/262; 364/510
[58] Field of Search ............... 137/486, 487.5, 8, 14, 137/1, 487, 624.11; 364/510; 73/262

[56] References Cited

U.S. PATENT DOCUMENTS 3,719,321  3/1973  McNabney ........................ 137/486
4,026,321  5/1977  Kahoe ........................... 137/487.5 X
4,277,832  7/1981  Wong ........................... 137/624.11 X
4,414,950  11/1983  Otsuka ............................. 123/440 X 4,581,707  4/1986  Millar ................................. 364/509

Primary Examiner—Alan Cohan
Attorney, Agent, or Firm—Donald C. Feix

[57] ABSTRACT

A method and apparatus for measuring gas flow volume in a system (of the kind in which the amount of gas flowing in a duct can vary in response to the variation of area of a variable area orifice in a duct and/or in response to changes in the total pressure of the gas upstream of the orifice) references the total pressure upstream of the orifice to the static pressure downstream of the orifice to produce a first signal representative of the differential pressure between the total pressure upstream of the orifice and the static pressure downstream of the orifice. The method and apparatus produce a second signal corresponding to the area of the opening in the orifice. The first and second signals are supplied to a gas flow volume database which is correlated to the sensors and to the orifice in the duct. The gas flow volume occurring in the duct at the first and second signals is read out from the database.

25 Claims, 5 Drawing Sheets

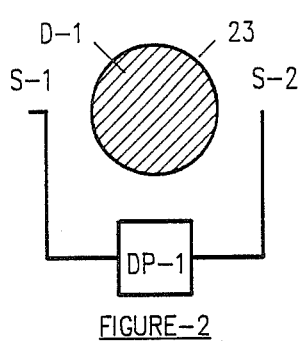
FIGURE-2
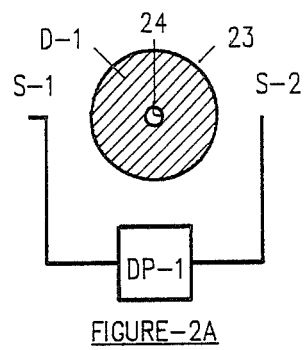
FIGURE-2A
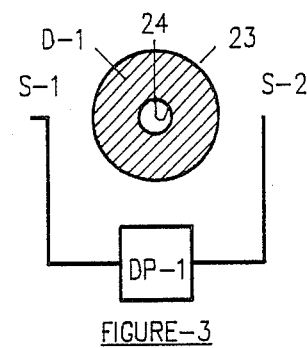
FIGURE-3
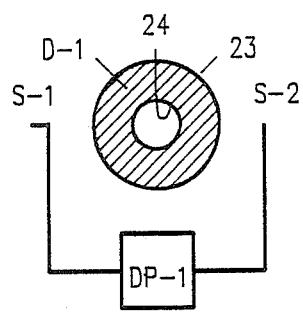
FIGURE-4
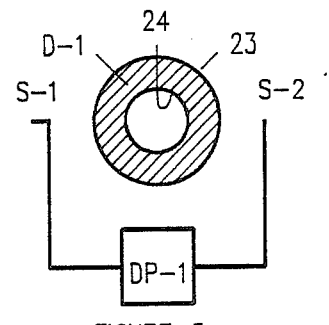
FIGURE-5
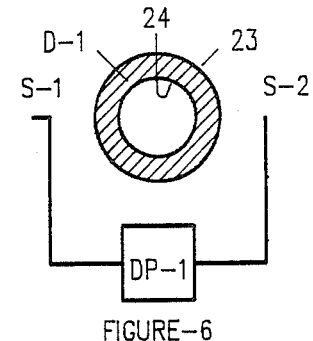
FIGURE-6
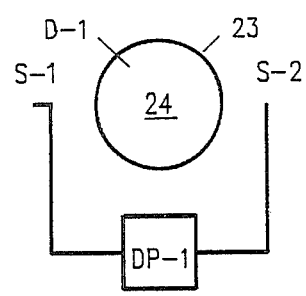
FIGURE-7
| FIGURE | PRESSURE DP-1 "W.C. | STATIC PRESSURE DROP ACROSS D-1 "W.C. | AVERAGE CROSS-SECTIONAL VELOCITY PRESSURE "W.C. | AVERAGE CROSS-SECTIONAL VELOCITY IN 6" DUCT F.P.M. | QUANTITY OF AIR IN A 6" DUCT C.F.M. | ORIFICE FREE AREA % |
|---|---|---|---|---|---|---|
| 2   | 1.0 | 1.00 | 0    | 0    | 0     | 0   |
| 2a  | 1.0 | .99  | .01  | 400  | 78.4  | 10  |
| 3   | 1.0 | .96  | .04  | 800  | 156.8 | 20  |
| 4   | 1.0 | .84  | .16  | 1600 | 313.6 | 40  |
| 5   | 1.0 | .64  | .36  | 2400 | 470.4 | 60  |
| 6   | 1.0 | .36  | .64  | 3200 | 627.2 | 80  |
| 7   | 1.0 | 0    | 1.00 | 4000 | 784   | 100 |
FIGURE-8

VARIABLE GAS VOLUME FLOW MEASURING AND CONTROL METHODS AND APPARATUS

BACKGROUND OF THE INVENTION

The present invention relates to methods and apparatus for measuring the gas flow volume in a system of the kind in which the amount of gas flowing in a duct can vary in response to variation of the area of a variable orifice in the duct and/or in response to changes in the total pressure of the gas upstream of the orifice.

This invention relates particularly to methods and apparatus for providing highly accurate measurements of gas flow at quite low gas flow volumes within the duct.

The present invention has particular application as a control for the air flow in a duct of a variable air volume air conditioning system of the kind used in buildings.

The present invention also has application to the measurement and to the control of gas flow for other gas flow volume systems. The present invention may, for example, be used to measure and to control the gas flow in an automotive system of the kind in which it is necessary to sense the level of a pollutant, e.g. the level of nitrogen oxide, in the exhaust gases of an internal combustion engine.

Obtaining an accurate measurement of quite low air flow volume (and exerting effective control over such low air flows) can present a number of practical problems in variable air volume air conditioning systems for buildings. The overall variable air volume system for an entire building is quite large and often requires a relatively large number of control devices for measuring and for controlling the air flow to localized zones or areas, such as individual rooms or suites within the building. Because a typical system may require a large number of control devices, it is desirable that the control devices be of a class which is not too expensive. The control devices should, however, be capable of producing accurate, repeatable flow measurements at both high flow velocities (in the range of 4,000 feet per minute in a typical six inch diameter duct) and at low flow velocities (in the range of 400 feet per minute or less). The devices should also be capable of being easily installed in the field and should require little or no field calibration or recalibration after installation.

Designing and manufacturing a control device which will meet all the requirements at high flow volumes is not too difficult.

But it is difficult to manufacture a control device which is cost effective and which performs satisfactorily for accurate measurement and control of flow volumes at low flow rates (in the range of 400 feet per minute or less).

Many of the existing measurement devices require an accurate sensing of the velocity pressure. The velocity pressure is a low number at low flow volumes. For example, in a conventional 6 inch diameter duct which produces one inch water column velocity pressure at 4,000 feet per minute flow velocity within the duct, a flow velocity of 400 feet per minute produces a velocity pressure of only 0.01 inch water column. If the accuracy of the measuring device is 1 percent at the one inch water column corresponding to 4,000 feet per minute (that is if the accuracy is plus or minus 0.01 inch water column at the high end) then the device can be off by factor of 100 percent (plus or minus 0.01 inch water column) at the 400 feet per minute flow velocity in the duct. There are many mechanical means to amplify, but such amplifier means are effective only at highest flow rates. The amplifiers present problems of measuring low flows.

It is a primary object of the present invention to overcome the problems associated with obtaining accurate measurements of gas flow volumes at quite low flow velocities.

It is a related object of the present invention to obtain and to use for gas flow measurement purposes, in a single damper system, a sensed pressure signal which provides a large amplitude signal (high number) at all flow volumes, including flow velocities which are quite small so that highly accurate flow measurements can be obtained even at the small flow velocities.

It is an object to achieve the foregoing by referencing the total pressure upstream of the damper to the static pressure downstream of the damper so that the sensed pressure condition is a condition which is representative of the differential pressure between the total pressure upstream of the damper and the static pressure downstream of the damper and is a signal which always has a high amplitude even at quite low gas flow velocities and volumes.

It is another, related object to do the pressure signal sensing in a way such that the basic indication of the air flow within the duct can be obtained by sensing the damper position and the basic indication of the air flow is not dependent upon obtaining an accurate indication of just a velocity pressure per se within the duct.

It is another object of the present invention to produce a manufactured product of consistent, predictable, reproducable geometry using standard sensors and which can be calibrated at the factory by locating one point on a defined database, identified by using one orifice area opening (one damper position) signal and one differential pressure signal generated at a known volume of air through the system.

SUMMARY OF THE PRESENT INVENTION

The present invention provides methods and apparatus for measuring gas flow volume in a system of the kind in which the gas flowing in a duct can vary in response to the variation of area of a variable area orifice in the duct formed by different damper positions and/or in response to changes of the total pressure of the gas upstream of the orifice and wherein the total pressure of the gas upstream of the orifice is referenced to the static pressure of the gas downstream of the orifice.

The methods and apparatus of the present invention comprise sensing the total pressure upstream of the orifice, sensing the static pressure downstream of the orifice, sensing a condition which is representative of the differential pressure between the total pressure upstream of the orifice and the static pressure downstream of the orifice, producing a first signal corresponding to said sensed condition representative of the differential pressure, producing a second signal corresponding to the area of the opening of the orifice represented by the damper position, supplying the first and second signals to a gas flow volume database which is correlated to the sensors and the orifice in the duct, and reading out from the database the gas flow volume occurring in the duct at the first and second signals.

The present invention also includes methods and apparatus for controlling the flow volume by positioning the damper to vary the area of the variable area orifice.

The present invention, in a preferred embodiment, includes constructing the database to have a single, non-dimensional curve for all amplitudes of the first and second signal.

The present invention also can include sensing a condition downstream of the damper and then controlling the gas flow volume in response to the sensed condition.

Methods and apparatus which incorporate the features noted above and which are effective to function as described above constitute further, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a side elevation view of apparatus constructed in accordance with one embodiment of the present invention for measuring and controlling gas flow volume in a system of the kind in which the amount of gas flowing in a duct can vary in response to the variation of area of a variable area orifice in the duct formed by different damper positions and/or in response to changes in the total pressure of the gas upstream of the orifice.

FIGS. 2 through 7 are end elevation views illustrating how the area for flow of gas through the variable area orifice varies with movement of a control element (such as a movable blade damper, movable cage damper or a movable conical damper). FIG. 2 shows the orifice completely closed and FIG. 7 shows the orifice completely open. FIGS. 3-6 show a progressively increasing area of opening of the orifice as the damper moves from full closed to full open.

FIG. 8 is a table which correlates sensed pressures and sensed orifice area opening signals (obtained in accordance with the present invention) with the respective FIG. 2 through FIGS. 5-7 showings. The chart of FIG. 8 assumes the gas is air, that the density is 0.075 pounds per cubic feet, that the total pressure at S1 with reference to S2 is held at one inch of water column, that the static pressure at S1 and S2 are equal in FIG. 7, that the duct is the same size upstream and downstream of the orifice, and that S2 is not affected by Vena Contracta. The illustrations in FIGS. 2-7 and the data in FIG. 8 are helpful to demonstrate a principle of the present invention, as will be described in more detail below in the specification.

DETAILED DESCRIPTION OF THE PREFERRED EMBODIMENTS

Figure 1:
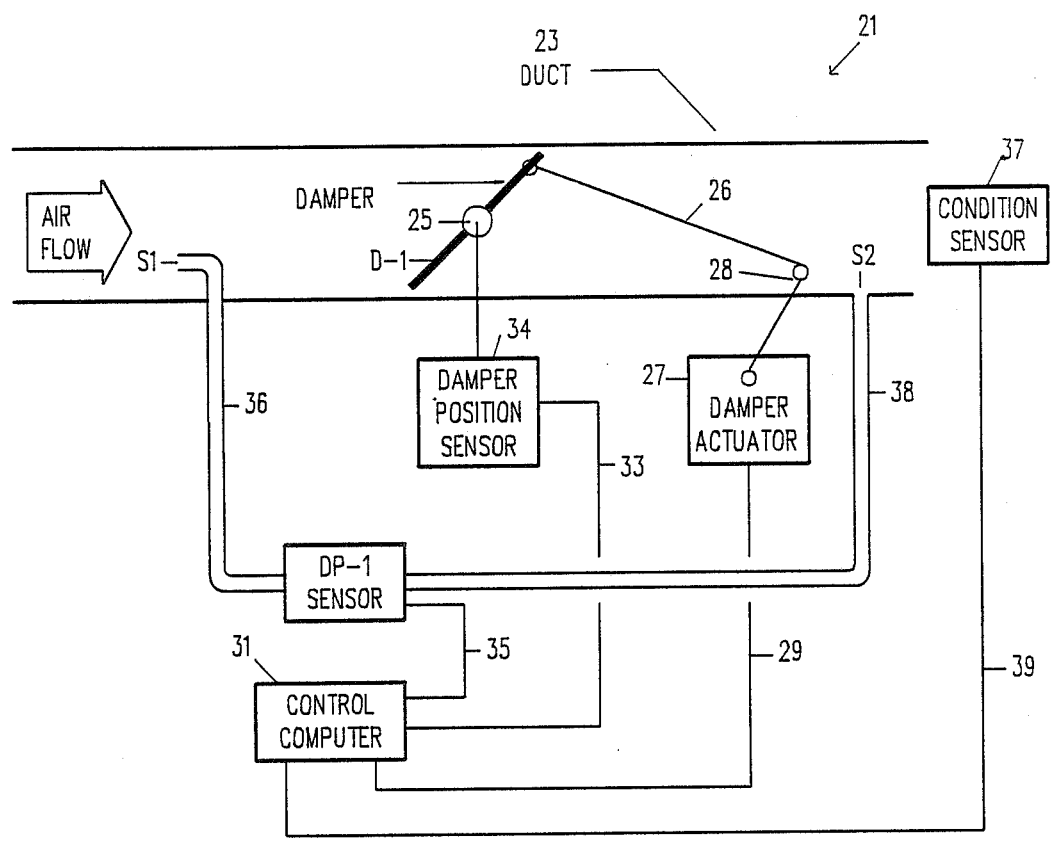

In FIG. 1 a gas flow volume measuring and control apparatus constructed in accordance with one embodiment of the present invention is indicated generally by the reference numeral 21.

The apparatus 21 measures gas flow volume in a system of the kind in which the amount of gas flowing in a duct can vary in response to the variation of area of a variable area orifice in the duct and/or in response to changes in the total pressure of the gas upstream of the orifice. The total pressure upstream of the variable area orifice is referenced to the static pressure downstream of the orifice. The present invention, as will be described in more detail below, senses the total pressure upstream of the orifice, senses the static pressure downstream of the orifice, and senses a condition which is representative of the differential pressure between said total pressure upstream of the orifice and said static pressure downstream of the orifice. The present invention produces a first signal corresponding to the sensed condition representative of differential pressure, produces a second signal corresponding to the area of the opening in the orifice, and supplies the first and second signals to a gas flow volume database correlated to the sensors and the orifice in the duct. The present invention reads out from the database the gas flow volume occurring in the duct at the sensed signals.

The present invention also permits controlling the flow volume by varying the area of the variable area orifice. The control may be in response to a set point and a sensed condition. The sensed condition may, for example, be the pressure, temperature and/or humidity in a space or in the duct. By way of 5 further example, the sensed condition may be the level of a pollutant, such as, for example nitrogen oxide in the exhaust gases of an internal combustion engine.

As illustrated in FIG. 1, the apparatus 21 comprises a duct 23.

A blade type damper D-1 is mounted for pivoting action on a pivot shaft 25 so that the damper D-1 can move between a position (see FIG. 2) in which the damper D-1 completely blocks gas flow through the duct 23 and a position (see FIG. 7) in which the damper D-1 is wide open and offers minimum or no resistance to air flow through the duct.

The position of the damper (the angle of rotation about the pivot 25) is controlled by a damper actuator 27 and a control line 29 from a computer/controller 31. The actuator 27 is connected to the damper D-1 through an articulated linkage 26–28.

The air flows through the duct from left to right (as indicated by the lengend "Air Flow" within the direction arrow shown in FIG. 1).

As illustrated in FIG. 1, the angular position of the damper D-1 is transmitted to the computer/controller 31 by a signal line 33. The signal line 33 receives its input signal from a damper position sensor 34 associated with the pivot shaft 25 for sensing the angular position of the shaft 25 and thus the position of the damper D-1 and thus the area of the opening for the variable area orifice provided by the movable damper D-1. In a specific embodiment of the present invention the sensor 34 is a potentiometer. A potentiometer 34 of only moderate cost supplies a very accurate indication of the angle of the damper D-1.

In another specific embodiment the sensor is a digital sensor which supplies a digital signal on the line 33. This embodiment is more expensive but produces a signal of very high accuracy.

In accordance with the present invention a sensor DP-1 senses a condition which is representative of the differential pressure between the total pressure upstream of the variable area orifice and the static pressure downstream of the variable area orifice.

A first sensor S1 senses the total pressure upstream of the orifice.

A second sensor S2 senses the static pressure downstream of the orifice.

The sensor DP-1 is connected to the probes S1 and S2 by conduits 36 and 38 as illustrated in FIG. 1. The sensor DP-1 may have any of the constructions shown in FIGS. 10-12, as described in more detail below. The sensor DP-1 produces the first signal (corresponding to the sensed condition which is representative of the differential pressure) noted above. This first signal is transmitted to the computer/controller 31 by a signal line 35.

In the present invention a very accurate measurement of the gas flow volume in the duct 23 can be obtained by supplying the first signal on the line 35 and the second signal on the line 33 to a gas flow volume database which is correlated to the sensors and to the orifice in the duct. A very accurate measurement of the gas flow volume can be obtained, even at quite low gas flow volumes, because (1) the DP-1 sensor is always dealing with a large signal quantity (the total pressure involved) rather than with a small signal quantity (for example, a flow pressure signal) which can become very small at low gas flow volumes, and (2) a potentiometer 34 (as noted above) supplies a very accurate indication of the angle of the damper D-1.

The gas flow volume, occurring in the duct at the sensed differential pressure and the orifice area opening, is then read out from the database.

Figure 9:
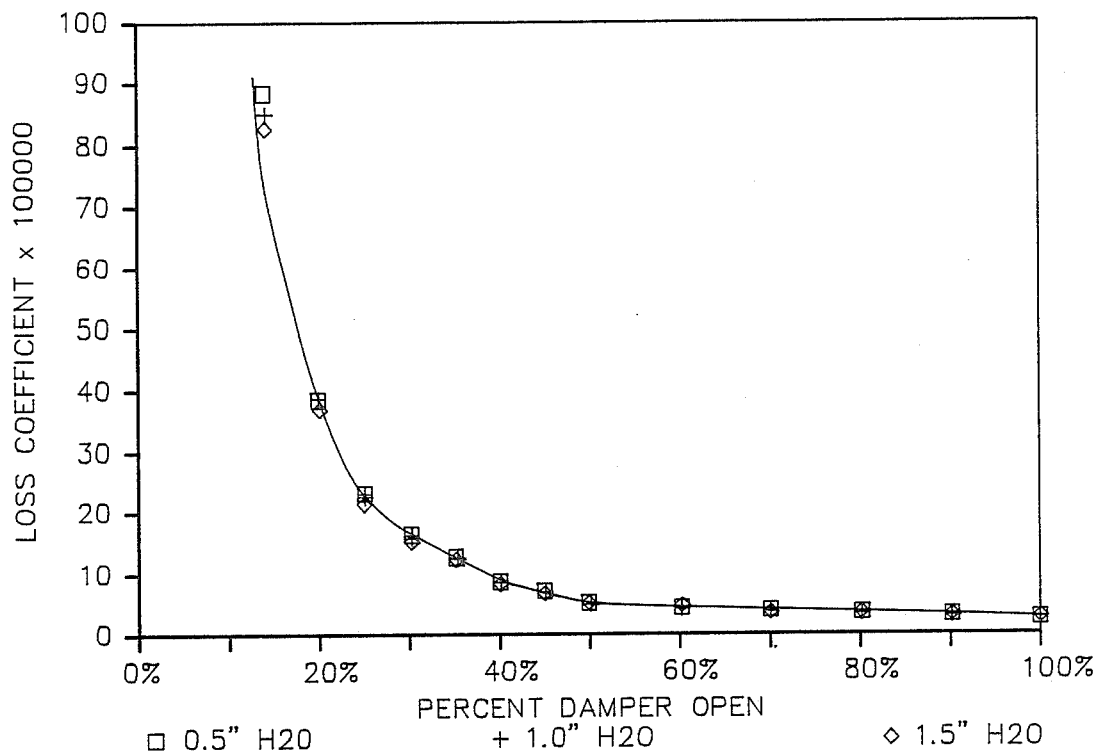
FIG. 9 is a graphical plot of database information used to read gas flow volume occurring in the duct at specific combinations of a sensed differential pressure signal and a sensed orifice area opening signal (damper position signal).

FIG. 9 illustrates a database constructed in accordance with the present invention. The method of construction of the database will be described in more detail below. The database shown in FIG. 9 is used to read out a loss coefficient which is directly and readily converted to the gas flow volume occurring in the duct at the sensed signals, as will also be described in more detail below.

To complete this initial summary of the structure and operation of the structure shown in FIG. 1, the apparatus 21 of the present invention in most cases includes a condition sensor 37 which is connected to the computer/controller 31 by a line 39 so that the apparatus 21 can be used not only to measure the gas flow in the duct 23 but also to control the gas flow volume occurring in the duct. The condition sensor 37 is used to sense a condition (such as the pressure, temperature and/or humidit in a space or in the duct 23) downstream of the damper D-1. In other applications, the sensed condition may be a level of a pollutant, such as, for example, the level of nitrogen oxide in the exhaust gases of an internal combustion engine.

The signal corresponding to the sensed condition is transmitted to the computer/controller 31 by the signal line 39. This signal is compared, in the computer 31, with a set point signal. The level of the set point signal can be varied manually or by programmed instructions. The difference between the sensed condition and the set point condition is then used by the computer to activate the damper actuator 27 to move the damper D-1 in the required direction to eliminate the difference between this condition and the set point condition or to bring the sensed condition within a certain range of the set point.

With this introductory description and summary of the apparatus 21 shown in FIG. 1, reference will now be made to FIGS. 2-8 to describe a principle of operation involved in the apparatus shown in FIG. 1.

For purposes of illustration the duct 23 in FIGS. 2-8 can be considered to be a 6 inch duct (0.196 square foot in cross sectional area), and a flow velocity of 4,000 feet per minute through the duct produces one inch of water column velocity pressure. A flow velocity of 400 feet per minute produces only 0.01 inch of water column velocity pressure. Multiplying 4,000 feet per minute air flow velocity in the duct times the cross sectional areas of the duct (0.196 square feet) produces a flow volume within the duct of 784 cubic feet per minute going through the 6 inch duct at 1.0 inch water column velocity pressure.

The velocity pressure being referred to here for a one inch water column at 4,000 feet per minute is derived from the formula—pressure total equals pressure static plus pressure velocity. The velocity pressure equals one inch water column for 4,000 feet per minute flow velocity within the 6 inch duct.

To better understand the advantages of the measurement method and apparatus of the present invention several things must be assumed for the explanation set out below.

It is assumed, for purposes of the discussion below relating to FIGS. 2-7 and the table shown in FIG. 8, that the gas is air, the density is 0.075 pounds per cubic feet, the total pressure at S1 with reference to S2 is held at 1 inch of water column, the static pressures at S1 and S2 are equal in FIG. 7, the duct is the same size upstream and downstream of the orifice 24 (the size of the opening between the damper D-1 and the interior of the duct 23), and S2 is not affected by Vena Contracta.

The objective of this explanation of FIGS. 2-8 is to demonstrate the simple principle of physics involved.

Total pressure is the sum of static pressure and velocity pressure.

In FIG. 2 (which represents the damper D-1 in the closed position) the DP-1 sensor is measuring only a difference in static pressure across the damper D-1.

In FIG. 7 the DP-1 sensor is measuring all velocity pressure.

In FIGS. 3-6 the DP-1 sensor is measuring a combination of static and velocity pressure or total pressure. The DP-1 sensor is a total pressure measuring device which measures the total pressure across the damper D-1.

All that is needed to obtain a cubic feet per minute reading for the airflow within the duct is the DP-1 reading and a calibrated orifice (damper position), and the cubic feet per minute can be calculated.

The definitions of total pressure as used above must be qualified. Normally total pressure is referenced to atmosphere. Here total pressure (S1) is referenced directly downstream of the orifice (the damper D-1) at S2. Although FIG. 1 shows S2 as atmosphere, it is unlikely that would be the case in any real application. By referencing total pressure to S2, there is no need to be concerned about any downstream restrictions or variables (that is any restrictions or any variables downstream of the location of the S2 sensor).

A major requirement for this system is a requirement to calibrate and to set up a database or lookup table for the computer/controller 31.

The apparatus 21, in its production form, is a predictable device and once a data base is established requires a minimum of calibration for like geometry.

To sum up some significant points with respect to the above explanation regarding FIGS. 2–8: the differential pressure S1 minus S2 is not affected by other pressure drops in the system; a calibrated database using a signal from the DP-1 sensor and a signal from the damper position sensor 34 can be constructed for convenient access by the computer/controller 31; the size of signal that the DP-1 sensor measures is total pressure reference to S2 and is a signal which has a large quantity (or high amplitude) even when the gas flow volume in the duct 23 is a quite low gas flow volume; and the DP-1 sensor is quite economical because the low end requirements are in 0.1 inch of water column instead of 0.01 inch of water column (the quantity required when using standard flow measurement methods).

To elaborate on this last point, the DP-1 sensor is always dealing (even at low gas flow volumes) with a large signal quantity (the total pressure involved) rather than with a signal quantity (for example, a velocity pressure signal) which can become very small at low gas flow volumes. This permits the present invention to use less sensitive devices and still maintain a high degree of accuracy.

This last point can perhaps be appreciated also by referring specifically to FIG. 3. In the case of the very small opening of the orifice 24 shown in FIG. 3, there is (as indicated in FIG. 8) a small amount of air flow velocity within the duct 23—in this case 156 cubic feet per minute (800 feet per minute flow velocity) as compared to 784 cubic feet per minute (4000 feet per minute flow velocity) when the damper is completely open as shown in FIG. 7. The apparatus 21 is thus producing a very low average cross sectional air velocity. Standard measurements as used in the industry would produce only a very low air velocity signal (0.04 inch water column) in this condition, but the DP-1 sensor of the present invention still has a large signal quantity to measure (in this case 1 inch water column total pressure). This large amplitude signal enables the sensor DP-1 to produce a signal on the line 35 which has a very high degree of accuracy.

As noted above, the practical application of the method and apparatus of the present invention requires that a database be constructed so that the computer/controller 31 can read out from the database the gas flow volume occurring in the duct at the sensed signals.

In the construction of a database for air conditioning an air flow measurement chamber should be designed to comply with or be better than the specifications of AMCA Standard §500-75, "Test Methods for Louvers, Dampers and Shutters", Air Movement and Control Association, Inc. adopted and revised 1974 (or a more current standard or applicable specifications). In applications other than air conditioning the air flow measurement chamber should be designed to comply with applicable specifications.

The database is constructed by obtaining the data of the first and second signals as generated at known volumes of air.

The database can be constructed in the form of lookup tables which would have separate curves corresponding to different respective quantities of the amplitude of the signal sensed by the DP-1 sensor. That is, the database could have one curve for a DP-1 signal of 0.5 inch of water column, a second curve for a DP-1 sensed signal of 1.0 inches of water column, a third signal for a DP-1 sensed signal of 1.5 inches of water column, etc.; and the flow rate in cubic feet per minute within the duct could be determined by the point at which particular damper openings (for example, a 20 percent damper opening, a 40 percent damper opening, a 60 percent damper opening, etc.) sensed signal intersected each one of those curves. A database which comprises lookup tables of this kind can have some disadvantages. For example, there can be a loss of some accuracy, lookup tables of this kind can require a substantial amount of memory, and the amount of time needed to construct a database of this kind can be a significantly long period of time.

A preferred way of constructing a database for use in the present invention is to construct a database which eliminates the need to store a large number of curves and which utilizes the principles of dimensional analysis to produce a single loss coefficient curve which accurately reflects all amplitudes of signals sensed by the DP-1 sensor. This database is shown in FIG. 9 and the method of constructing this database will now be described in more detail below.

In obtaining the data for constructing the database curve shown in FIG. 9, a number of test runs were made in which the total pressure is held at a constant amount and the damper was progressively moved between full open and full closed positions. That is, one run was made in which the pressure total was held at a constant half inch total pressure and the damper was moved to different positions and appropriate measurements were made. Another run was made with the total pressure held constant at one inch water column and the damper position varied, and another run was made at a constant 1½ inch water column total pressure as the damper position was moved from full open to full closed. It should be noted that in constructing a database using principles of dimensional analysis, it is not necessary to hold the total pressure at a constant level if enough points are obtained to produce an accurate curve.

Once these test runs have been made for a particular damper configuration and a particular sensor configuration, then the data can be reduced to provide the data base information for that particular apparatus; and, as that particular apparatus comes through the factory on a production line, it is necessary only to calibrate that apparatus at one point; and that particular apparatus is then calibrated for all other points and does not need any field calibration.

The database construction procedure used for producing the loss coefficient curve shown in FIG. 9 produces a set of data specific to the damper design and geometry. For a specific damper design there is a unique calibration curve relating the air flow rate to the damper position for different DP-1 pressure difference signals, flow properties and duct diameters. To remove the large number of curves that would have to be stored in a computer (for a database in the form of a look up table which had a separate curve for each amplitude of sensed DP-1 signals), dimensional anaylsis was utilized.

The dimensional parameters that could effect the sensed DP-1 sensor signal are the following:
1. the percent the damper was open, D;
2. the air flow rate, Q;
3. the upstream duct diameter, d;
4. the air density, Rho.

According to the dimensional analysis, the non-dimensional DP-1 pressure signal expressed as the loss coefficient $C_L$ should be a function of the percent damper opening, D and the flow Reynolds number Re.

$$C_L = f(D, Re)$$

where $C_L = (DP\text{-}1\ d^4)/(Rho\ Q^2)$
$D = \%$ damper open
$Re = (Rho\ Q\ d)/(Mu\ A_d)$
DP-1 = Signal sensed by DP-1 sensor
d = Diameter of duct
Rho = Air density in duct
Mu = Viscosity
Q = Volume airflow rate
Ad = Cross sectional area of the duct This analysis results in a family of curves of loss coefficient versus damper opening with the Reynolds number as a parameter. If the calibration is expressed in terms of these nondimensional parameters, than the number of calibration curves is reduced. The experiments showed that the Reynolds number was not an important parameter. Therefore, for each damper design, there was only one curve relating the loss coefficient to the damper opening. The curve resulting from the dimensional analysis can be approximated using a least squares fit. This fit is then written into a control algorithm used in computer/controller 31.

In applying the present invention in the field a microprocessor of the computer/controller 31 uses the following algorithm:
1. Read the values of the differential pressure and the damper position sensors using an analog-to-digital sensor or an analog-to-digital converter (if required).
2. Determine the appropriate curve segment on the calibration curve for the damper position signal.
3. Substitute the damper position signal into the curve segment to obtain a loss coefficient.
4. Use the loss coefficient and the DP-1 pressure signal and solve for the airflow equation:

$$Q = [(C_L\ Rho)/(DP\text{-}1\ d^4)]^{\frac{1}{2}}$$

5. Return to the main control loop to determine the appropriate control decision based on this flow rate.

This last step (step 5) assumes that the gas flow is to be controlled as well as to be measured.

The single curve database thus constructed and shown in FIG. 9 reduces the amount of memory required and also reduces the manipulation that has to be done of that memory data, as compared to the amount of memory required and the amount of manipulation that would be required for multicurve database.

While the curve shown in FIG. 1 is for a damper having a conical geometry, a similar, single, loss coefficient curve is produced for dampers having other kinds of geometries, as, for example, a blade type damper as shown in FIG. 1, or a sash damper. The damper position sensor 34 does not have to be physically tied to the damper, but may instead sense the damper position by an indirect method such as, for example, an infra-red or an ultra-sonic device.

It is a very important feature of the present invention that the apparatus, including the variable orifice and the associated hardware, is a manufactured product of consistent, predictable reproducible geometry, using standard sensors, and is a product which can be calibrated at the factory by locating one point on the defined database, identified by using one orifice area opening signal, and one differential pressure signal generated at a known volume of air through the system.

The apparatus 21 is then ready for use in the field without the need for additional calibration.

The present invention enables apparatus to be constructed which produces very accurate measurements with relatively low cost, rotational potentiometers and with low cost DP-1 pressure sensor constructions.

Figure 10:
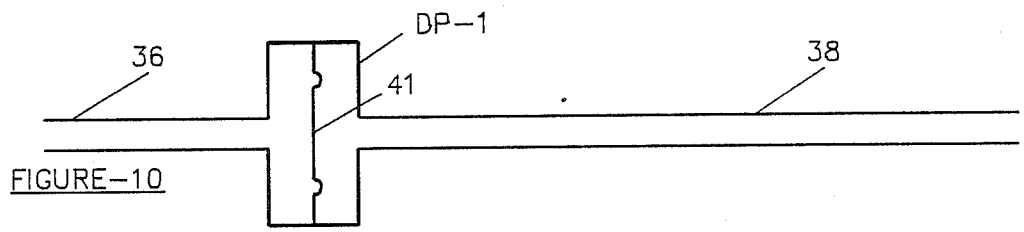
FIGS. 10, 11 and 12 are side elevation views showing details of different sensor constructions which can be used for sensing a condition which is representative of the differential pressure between the total pressure upstream of the orifice and the static pressure downstream of the orifice.
Figure 11:
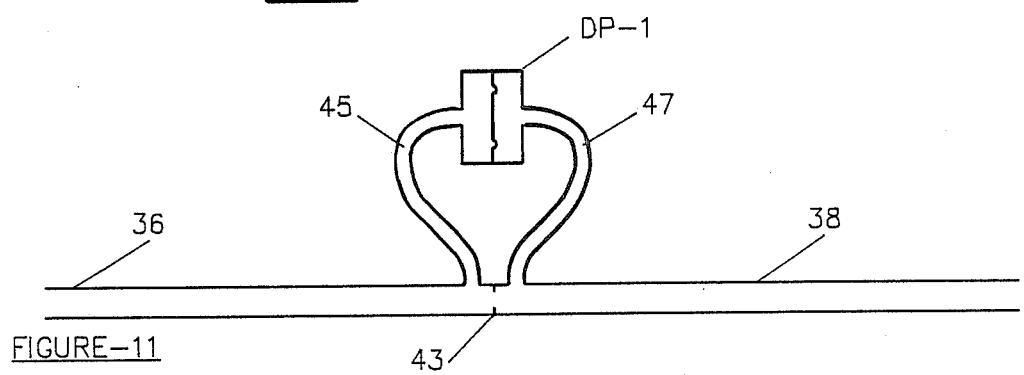
Figure 12:
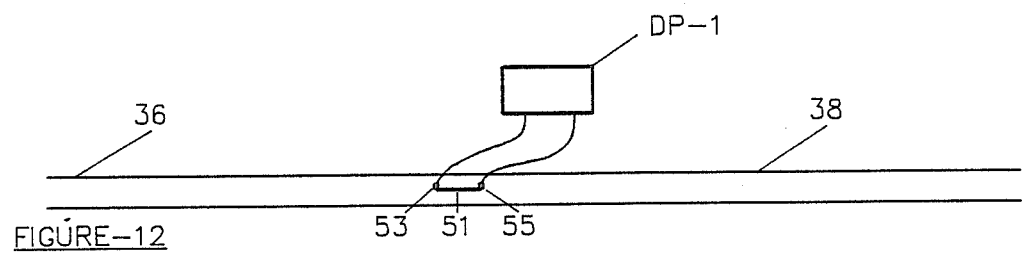

FIGS. 10, 11 and 12 show three different constructions of DP-1 sensors which may be used in the present invention.

In FIG. 10 the DP-1 sensor is a sensor which has a diaphragm or piezoelectric element 41 directly exposed on opposite sides of the element 41 to the respective pressures within the conduits 36 and 38.

FIG. 11 shows a square edge orifice or a nozzle type sensor. In this case a square edge orifice or nozzle 43 is mounted within the flow passage way connecting the conduits 36 and 38. A conduit 45 transmits the pressure upstream of the orifice 43 to one side of the diaphragm or piezoelectric 41, and a conduit 47 conducts the pressure downstream of the orifice 43 to the other side of the element 41.

In FIG. 12 the sensor DP-1 is a hot wire anemometer type sensor. As illustrated in FIG. 12, a hot wire anemometer 51 is disposed within a flow conduit interconnecting the conduits 36 and 38. A first heated wire 53 and a second heated wire 55 produce a signal corresponding to a condition representative of the differential pressure between the sensors S1 and S2. The airflow across the hot wire anemometer 51 cools the wire 53 more than it cools the wire 55, and this difference in the cooling causes the sensor DP-1 to produce a signal on line 35 which is an accurate indication of the total pressure across, the damper.

Each of the sensor constructions shown in FIGS. 1–7 and in FIGS. 10–12 is a known, commercially available sensor construction. Other commercially available sensor constructions may be used. The novelty associated with the sensors S1 and S2 in FIGS. 1–7 and the sensors DP-1 shown in FIGS. 10 and 12 is the way in which the sensors are used with the other features of the present invention to obtain a measurement of the gas flow volume in the duct.

The present invention provides a system for making accurate measurements of gas flow volumes and is quite useful for obtaining accurate measurements at quite low gas volume flows. The present invention obtains these results while using manufactured products of consistent, predictable, reproducible geometry which can be calibrated at the factory, all as noted above.

The present invention also permits the flow not only to be measured but to be controlled in response to a sensed condition.

As shown in FIG. 1, a condition sensor 37 can be located downstream of the damper D-1 for sensing a particular condition related to the gas flowing through the duct 23.

In the case of a conditioned air system, the sensed condition may be the temperature and/or humidity in a space or in the duct downstream of the damper D-1.

In other applications the sensed condition may be the level of a pollutant, such as, for example, on the level of nitrogen oxide in the exhaust gases of an internal combustion engine.

The signal corresponding to the sensed condition is transmitted to the computer controller 31 by the signal line 31. This signal is compared, in the computer 31, with a set point signal. The level of the set point can be varied manually or by programmed instructions. The difference between the sensed condition and the set point condition is then used by the computer to activate the damper actuator 27 to move the damper D-1 is the required direction to eliminate the difference between this condition and the set point condition or to bring the sensed condition within a certain range of the set point.

Figure 13:
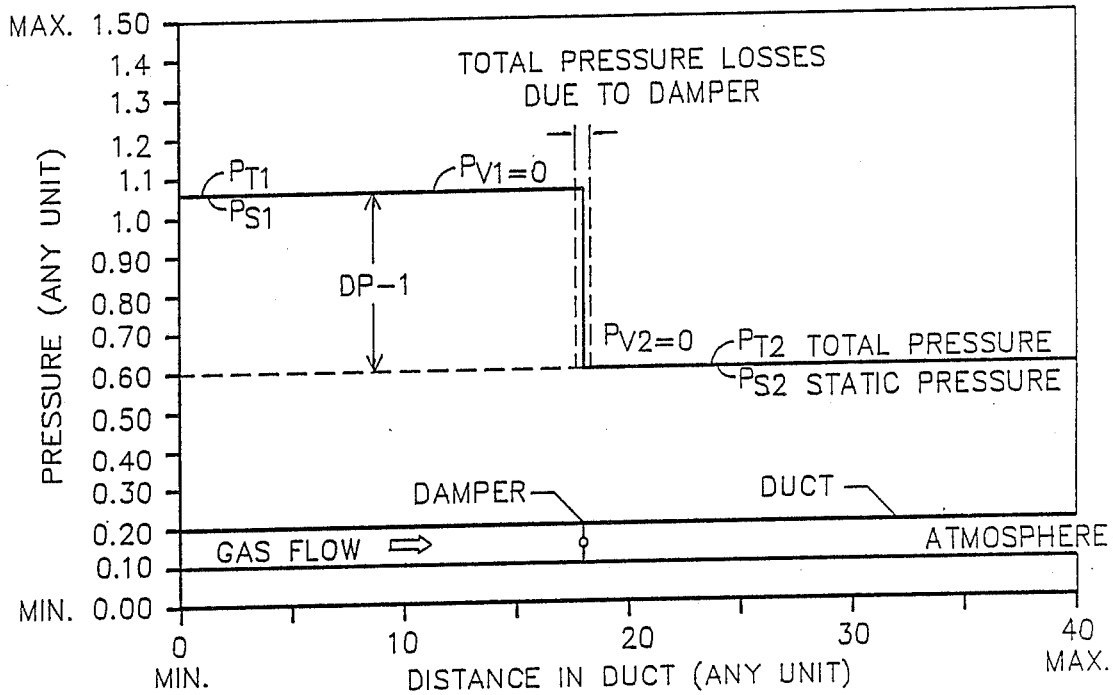
FIGS. 13, 14 and 15 are plots of pressure losses along a duct when a blade damper is fully closed (FIG. 13), partly open (FIG. 14) and fully opened (FIG. 15).
Figure 14:
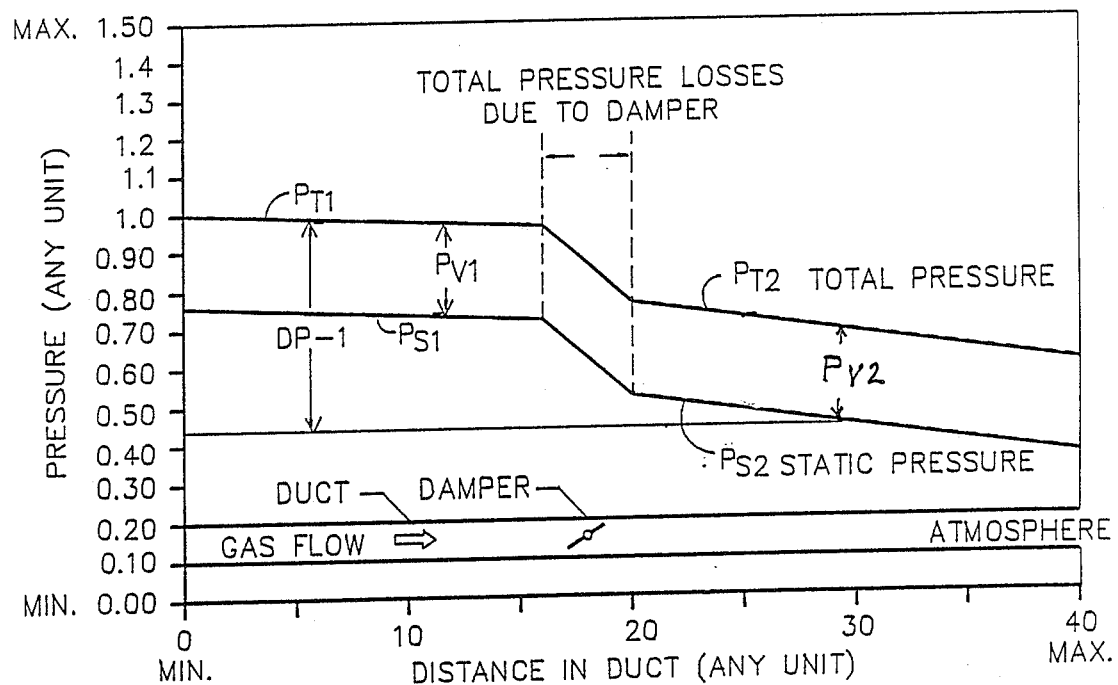
Figure 15:
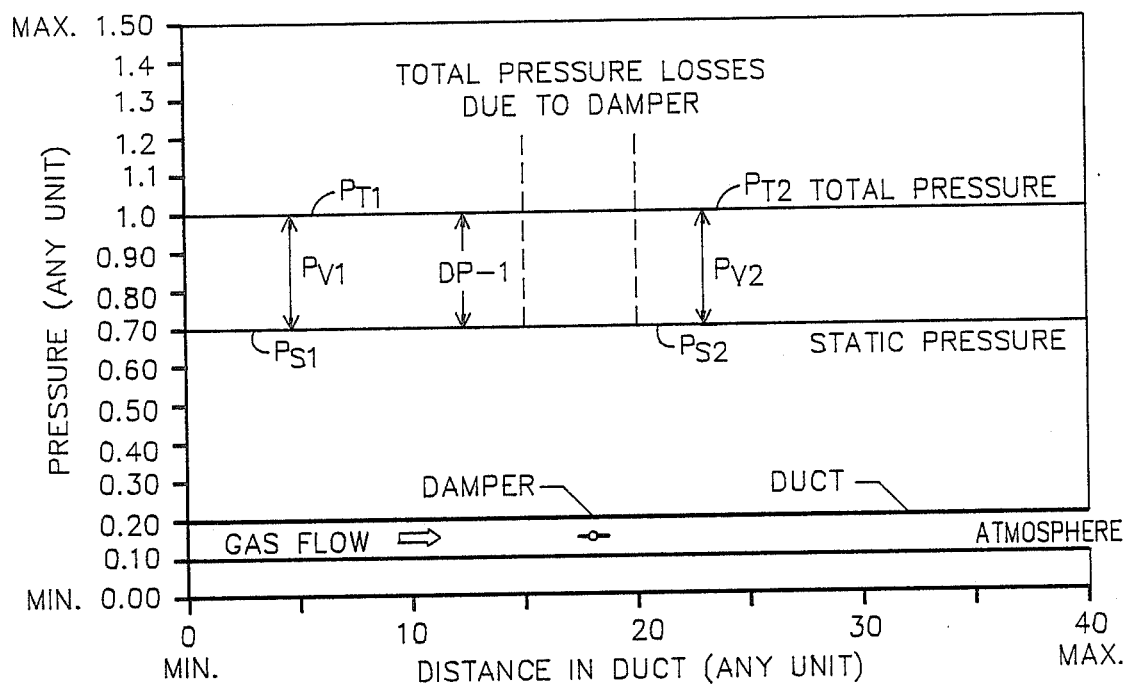

FIGS. 13, 14 and 15 are plots of pressure losses along a duct when a blade damper is fully closed (FIG. 13), partly open (FIG. 14),and fully opened (FIG. 15). These figures show graphically how the differential pressure DP-1 between the total pressure $P_{T1}$ upstream of the damper and the static pressure $P_{S2}$ downstream of the damper remains a large quantity for all positions of the damper and for all gas flow volumes and velocities including low gas flow volumes and velocities.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of measuring gas flow volume in a system of the kind in which the amount of gas flowing in a duct can vary in response to the variation of area of a variable area orifice in the duct and/or in response to changes in the total pressure of the gas upstream of said orifice and wherein the total pressure upstream of the orifice is referenced to the static pressure downstream of the orifice, said method comprising,
    sensing the total pressure upstream of said orifice,
    sensing the static pressure downstream of said orifice,
    sensing a condition which is representative of the differential pressure between said total pressure upstream of the orifice and said static pressure downstream of the orifice,
    producing a first signal corresponding to said sensed condition representative of the differential pressure,
    producing a second signal corresponding to the area of the opening in the orifice,
    supplying said first and second signals to a gas flow volume database correlated to the sensors and the orifice in the duct, and
    reading out from the database the gas flow volume occurring in the duct at the first and second signals.

2. The invention defined in claim 1 including constructing the database by obtaining the data of said first and second signals generated at known volumes of air.

3. The invention defined in claim 2 including constructing the database to have a single, non-dimensional curve for all amplitudes of said first signal.

4. The invention defined in claim 2 including calibrating a system which has a variable area orifice of a particular geometry, sensors of a particular geometry for producing said first signal and a sensor of a particular construction for producing the second signal, said calibrating including locating a point on the database by using one first signal and one second signal generated at a know volume of air.

5. The invention defined in claim 1 wherein the sensing of said condition is accomplished by an element which is directly exposed on one side to the total pressure upstream of said orifice and which is directly exposed on another side to the static pressure downstream of said orifice.

6. The invention defined in claim 1 wherein the sensing of said condition is accomplished by a square edge orifice which is directly exposed on one side to the total pressure upstream of said orifice and which is exposed on the other side to the static pressure downstream of said orifice.

7. The invention defined in claim 1 wherein the sensing of said condition is accomplished by a hot wire anemometer sensing apparatus which is directly exposed on one side to the total pressure upstream of said orifice and which is directly exposed on another side to the static pressure downstream of said orifice.

8. The invention defined in claim 1 including controlling the flow volume by varying the area of the variable area orifice.

9. The invention defined in claim 8 including sensing a condition downstream of the variable area orifice and controlling the opening of the orifice in response to said sensed condition.

10. The invention defined in claim 9 wherein the sensed condition is the temperature of the gas flow downstream of the variable area orifice.

11. The invention defined in claim 9 wherein the sensed condition is the level of a pollutant in the gas flow downstream of the variable area orifice.

12. The invention defined in claim 1 wherein the amount of gas flowing in the duct varies from quite low volumes of gas flowing at quite low velocities to quite large volumes of gas flowing at relatively high flow velocities and wherein the first signal produced is always a signal of relatively large amplitude, even at low gas flow volumes and velocities, so that highly accurate flow measurements can be obtained with sensors that do not need to be constructed for high accuracy at quite low amplitude levels of a sensed condition, such as low gas flow volumes and velocities.

13. Apparatus for measuring gas flow volume in a system of the kind in which the amount of gas flowing in a duct can vary in response to the variation of area of a variable area orifice in the duct and/or in response to changes in the total pressure of the gas upstream of said orifice and wherein the total pressure upstream of the orifice is referenced to the static pressure downstream of the orifice, said apparatus comprising,
    total pressure means for sensing the total pressure upstream of said orifice,
    static pressure means for sensing the static pressure downstream of said orifice,
    condition sensing means for sensing a condition which is representative of the differential pressure between said total pressure upstream of the orifice and said static pressure downstream of said orifice,
    first signal producing means-for producing a first signal corresponding to said sensed condition representative of the differential pressure, second signal producing means for producing a second signal corresponding to the area of the opening in the orifice, gas flow volume database means correlated to the sensors and the orifice in the duct, signal supply means for supply said first and second signals to the gas flow volume database means, and readout means for reading out from the database the gas flow volume occurring in the duct at the first and second signals.

14. The invention defined in claim 13 wherein the database means are constructed by obtaining the data of said first and second signals generated at known volumes of air.

15. The invention defined in claim 13 wherein the database means are constructed to have a single, non-dimensional curve for all amplitudes of said first signal.

16. The invention defined in claim 13 wherein the database means permit a system which has a variable area orifice of a particular geometry, sensors of a particular geometry for producing said first signal and a sensor of a particular construction for producing the second signal to be calibrated by locating a point on the database by using one first signal and one second signal generated at a known volume of air.

17. The invention defined in claim 13 wherein the first signal producing means include an element which is directly exposed on one side to the total pressure upstream of said orifice and which is directly exposed on another side to the static pressure downstream of said orifice.

18. The invention defined in claim 13 wherein the first signal producing means include a square edge orifice sensing apparatus which is directly exposed on one side to the total pressure upstream of the orifice and which is exposed on the other side to the static pressure downstream of said orifice.

19. The invention defined in claim 13 wherein the first signal producing means include a hot wire anemometer sensing apparatus which is directly exposed on one side to the total pressure upstream of the orifice and which is exposed on the other side to the static pressure downstream of said orifice.

20. The invention defined in claim 13 including control means for controlling the flow volume by varying the area of the variable area orifice.

21. The invention defined in claim 20 including condition sensing means for sensing a condition downstream of the variable area orifice and connected to the control means for controlling the opening of the orifice in response to said sensed condition.

22. The invention defined in claim 21 wherein the sensed condition is the temperature of the gas flow downstream of the variable area orifice.

23. The invention defined in claim 22 wherein the sensed condition is the level of a pollutant in the gas flow downstream of the variable area orifice.

24. The invention defined in claim 13 wherein the amount of gas flowing in the duct varies from quite low volumes of gas flowing at quite low velocities to quite large volumes of gas flowing at relatively high flow velocities and wherein the first signal producing means are effective to produce a first signal which is always a signal of relatively large amplitude, even at low gas flow volumes and velocities, so that highly accurate flow measurements can be obtained with sensors that do not need to be constructed for high accuracy at quite low amplitude levels of a sensed condition, such as low gas flow volumes and velocities.

25. The invention defined in claim 13 wherein there is a need for high accuracy measurement and wherein said condition sensing means and said first signal producing means are effective to produce a first signal which is a highly accurate differential pressure signal and wherein the second signal producing means include a highly accurate stepper motor which produces a highly accurate signal corresponding to the area opening in the orifice so that the apparatus for measuring gas flow volume gives high accuracy which is required for metering.

* * * * *